United States Patent [19]

Gray

[11] Patent Number: 5,110,251
[45] Date of Patent: May 5, 1992

[54] HYDRAULIC PLATFORM LIFT FOR TRUCK TRAILERS

[76] Inventor: Ralph E. Gray, 561 Fallingbrook Drive, Waterloo, Ontario, Canada, N2L 4N2

[21] Appl. No.: 536,770

[22] Filed: Jun. 12, 1990

Related U.S. Application Data

[63] Continuation-in-part of Ser. No. 297,930, Jan. 17, 1989, abandoned.

[51] Int. Cl.⁵ ............................................. B60P 1/44
[52] U.S. Cl. ............................... 414/545; 414/540; 91/402; 91/420; 91/520; 91/399; 187/9 R; 187/17; 254/89 H
[58] Field of Search .............. 414/540, 545, 662, 663, 414/672, 673; 187/9 R, 17; 254/89 H; 91/399, 400, 402, 420, 520

[56] References Cited

U.S. PATENT DOCUMENTS

| | | | |
|---|---|---|---|
| 2,112,466 | 3/1938 | Maloon | 60/471 |
| 3,502,002 | 3/1970 | Whiteman, Jr. | 60/533 X |
| 3,990,583 | 11/1976 | Nishida et al. | 91/420 X |
| 4,205,591 | 6/1980 | Mickelson | 91/420 X |
| 4,354,688 | 10/1982 | Swanson | 91/520 X |
| 4,463,563 | 8/1984 | Krehbiel | 60/546 X |
| 4,529,351 | 7/1985 | Olins | 414/545 |
| 4,563,121 | 1/1986 | Drews | 414/545 |
| 4,638,886 | 1/1987 | Marietta | 187/17 X |
| 4,655,031 | 4/1987 | Kucera | 91/520 X |

FOREIGN PATENT DOCUMENTS

| | | | |
|---|---|---|---|
| 2752555 | 6/1978 | Fed. Rep. of Germany | 254/89 H |
| 3507231 | 9/1986 | Fed. Rep. of Germany | 187/9 R |
| 723091 | 3/1980 | U.S.S.R. | 91/520 |
| 793924 | 2/1981 | U.S.S.R. | 254/89 H |
| 1202317 | 8/1970 | United Kingdom | 414/545 |

Primary Examiner—Robert J. Spar
Assistant Examiner—Robert S. Katz
Attorney, Agent, or Firm—Daryl W. Schnurr

[57] ABSTRACT

A hydraulic platform lift for use on trucks and truck trailers has two hydraulic cylinders, one on each side of a door. The cylinders are phasing cylinders in that one cylinder is larger than the other cylinder by a specific ratio. The cross-sectional area of the fluid in the rod end of the larger cylinder minus the area of the rod is equal to the cross-sectional area of the smaller cylinder. A connecting line interconnects the rod end of the large cylinder with the cap end of the small cylinder. Hydraulic fluid can be directed by a controller into the cap end of the large cylinder or the rod end of the small cylinder. For upward movement, hydraulic fluid is forced into the rod end of the small cylinder. This in turn forces hydraulic fluid through the connecting line into the rod end of the large cylinder, thereby raising both pistons. For downward movement, hydraulic fluid is forced into the cap end of the large cylinder, thereby forcing fluid out of the rod end of the large cylinder and into the cap end of the small cylinder. This causes both cylinders to move downward. The platform lift also has a self-levelling feature whereby the pistons can be made level with one another by moving the platform into an uppermost position. The operational mechanism is located entirely at the sides of the trailer. The lift platform can be made to exert a positive upward force or a positive downward force during use.

14 Claims, 4 Drawing Sheets

HYDRAULIC PLATFORM LIFT FOR TRUCK TRAILERS

This is a continuation-in-part application of application Ser. No. 07/297,930 filed Jan. 17, 1989 now abandoned.

BACKGROUND OF THE INVENTION

1. Field of the Invention

This invention relates to hydraulic platform lifts for use on truck trailers and the like for loading or unloading cargo when no loading dock is available.

2. Description of the Prior Art

Previous lift platforms are generally of two types. A first type is often referred to as a TUK-A-WAY (a trade mark) where the platform is tucked away underneath the rear end of the trailer when not in use and through hydraulic means it can emerge from beneath the trailer for use in raising or lowering cargo. The TUK-A-WAY lift has one hydraulic cylinder which can be used to provide a positive force to the platform in an upward direction but no force is applied to the platform in the downward direction. The platform simply lowers by gravity as the hydraulic pressure is released. The TUK-A-WAY lift cannot be used where the rear axle of the trailer is located close to the rear of the trailer (as is often the case) as there is then no space for the TUK-A-WAY to be stored when it is not in use. A second type of lift has a horizontal hydraulic cylinder that is used in conjunction with several complex connectors and cables to move a platform located at the rear of a trailer upward. This type of platform lift also moves the platform downward by gravity as hydraulic pressure is released. There is no positive force moving the platform downward. This type of lift stores the platform in an upper vertical position when the truck is travelling down a highway. The platform can be moved into an upper horizontal position, a lower horizontal position or a lower vertical position for loading or unloading cargo, as desired. In the travel position, the cylinder is extended and is thus exposed to the elements, such a road salt. With previous lifts, since there is no positive downward force that can be exerted on the platform hydraulically, if the lift is not working perfectly, the platform will often not lower unless it is loaded with cargo. Further, if one of the hydraulic lines breaks when the platform is in an upper position, it will crash to the ground, with or without cargo as the hydraulic pressure is released. Obviously, personal injury or damage to the cargo can result. Previous platform lifts are too complex, subject to frequent mechanical failure or too expensive to manufacture. Further, with previous platform lifts, when the lift is located at the rear of the lead unit of a B-train, many lifts are completely unsuitable as they prevent the connection of the fifth wheel to the B-train trailer so that the rear trailer can be connected. A B-train is a trucking system where a tractor pulls two trailers simultaneously. The pivot pin of the second trailer rests on a fifth wheel secured to the rear of the first trailer. Previous platform lifts are designed for a trailer of a specific width and cannot be easily adapted to a trailer with a different width.

SUMMARY OF THE INVENTION

A platform lift for use with a cargo door of a truck or trailer has a platform with an upper surface and two ends. The cargo door has a lower edge and two sides and the truck or trailer rests on a supporting surface. There are two vertically mounted hydraulic cylinders, a first cylinder being mounted at one side of said door and a second cylinder being mounted at one side of said door and door, each cylinder containing a rod and piston. Each cylinder has a rod end and a cap end with the platform being connected to the rod of each cylinder. The first cylinder has a larger cross-sectional size than the second cylinder such that a cross-sectional area of the first cylinder at the rod end minus a cross-sectional area of the rod of the first cylinder is substantially equal to a cross-sectional area of the second cylinder at the cap end. The cylinders are connected by a connecting line so that hydraulic fluid can flow through the rod end of the first cylinder and the cap end of the second cylinder as the cylinders are activated, said cylinders in said connecting line being a cylinder portion, said cylinder portion having an entrance where hydraulic fluid enters the cylinder portion and an exit where hydraulic fluid exits the cylinder portion. Control means, reservoir means and pumping means for hydraulic fluid are connected with said cylinder portion to form a closed hydraulic circuit to activate the cylinders of said cylinder portion. Said control means including a counterbalance valve so that, when hydraulic fluid is forced into the entrance of said cylinder portion;

(i) said counterbalance valve is mounted to control, during the lowering of the platform, flow of hydraulic fluid from said exit from said cylinder portion;

(ii) said counterbalance valve sensing pressure, during downward movement of the platform, of the hydraulic fluid being forced into the entrance of said cylinder portion from said pumping means to ensure that said pressure does not fall below a predetermined minimum by decreasing the flow of hydraulic fluid from said exit from said cylinder portion;

(iii) said counterbalance valve permitting said platform to be lowered while preventing hydraulic fluid from flowing out of said exit from said cylinder portion at a rate that is faster than the pumping means can pump fluid into the entrance of said cylinder portion.

Each rod of the cylinders has a free end opposite to an end that is connected to the piston, the free ends of the rods and the platform being connected so that the platform can be moved upward or downward between a lower edge of said door and said supporting surface with a positive force by appropriately activating the cylinder so that the pistons move upward or downward hydraulically. The platform is pivotally connected so that its upper surface can be moved from a vertical position to a horizontal position and vice-versa, as desired. The platform is capable of being located at a vertical position entirely below the door of the truck or trailer by forcing the cylinders downward.

DESCRIPTION OF A PREFERRED EMBODIMENT

Figure 1:
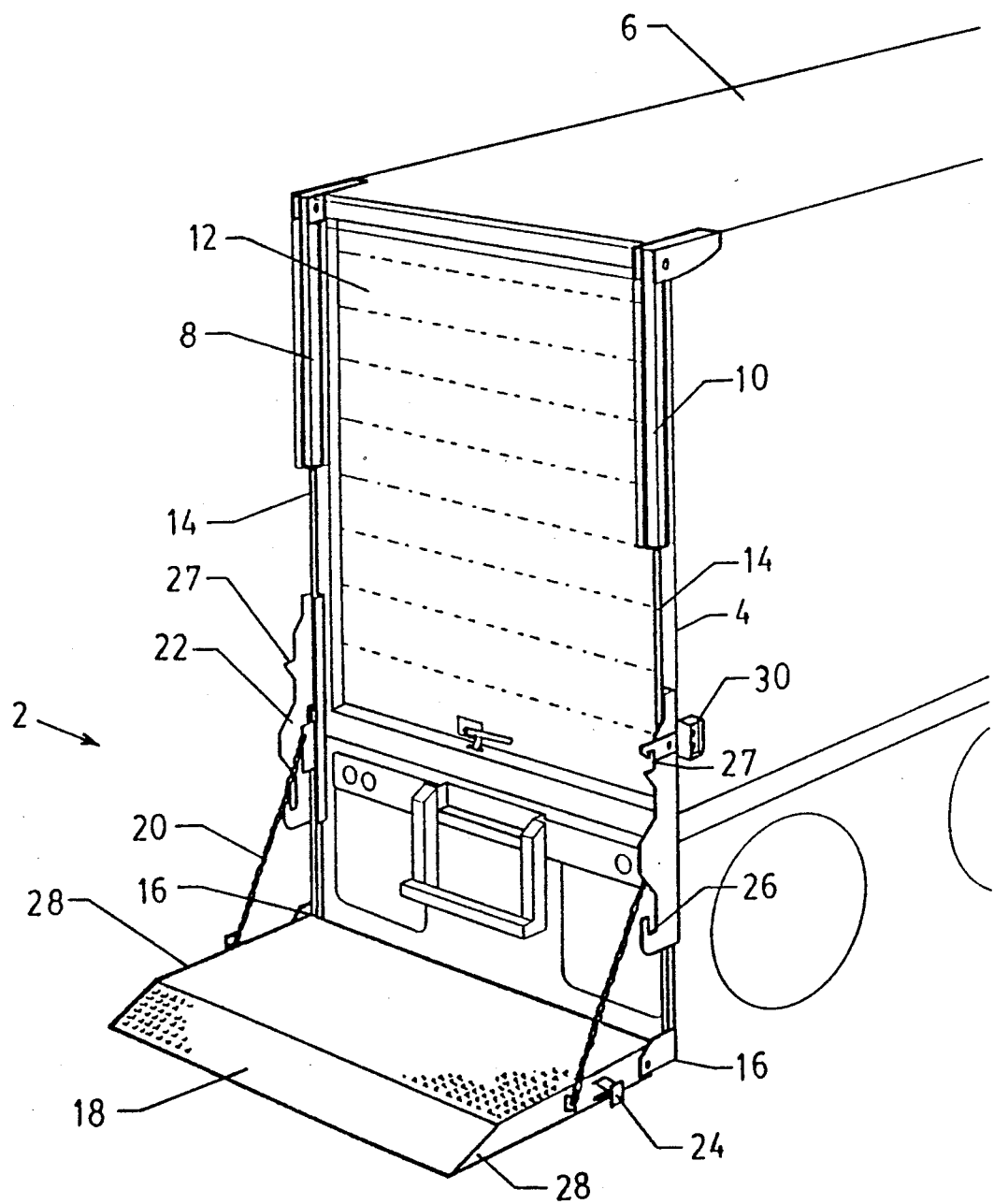
FIG. 1 is a partial perspective view of a platform lift located at the rear of a trailer where the platform is in a lower horizontal position.
Figure 2:
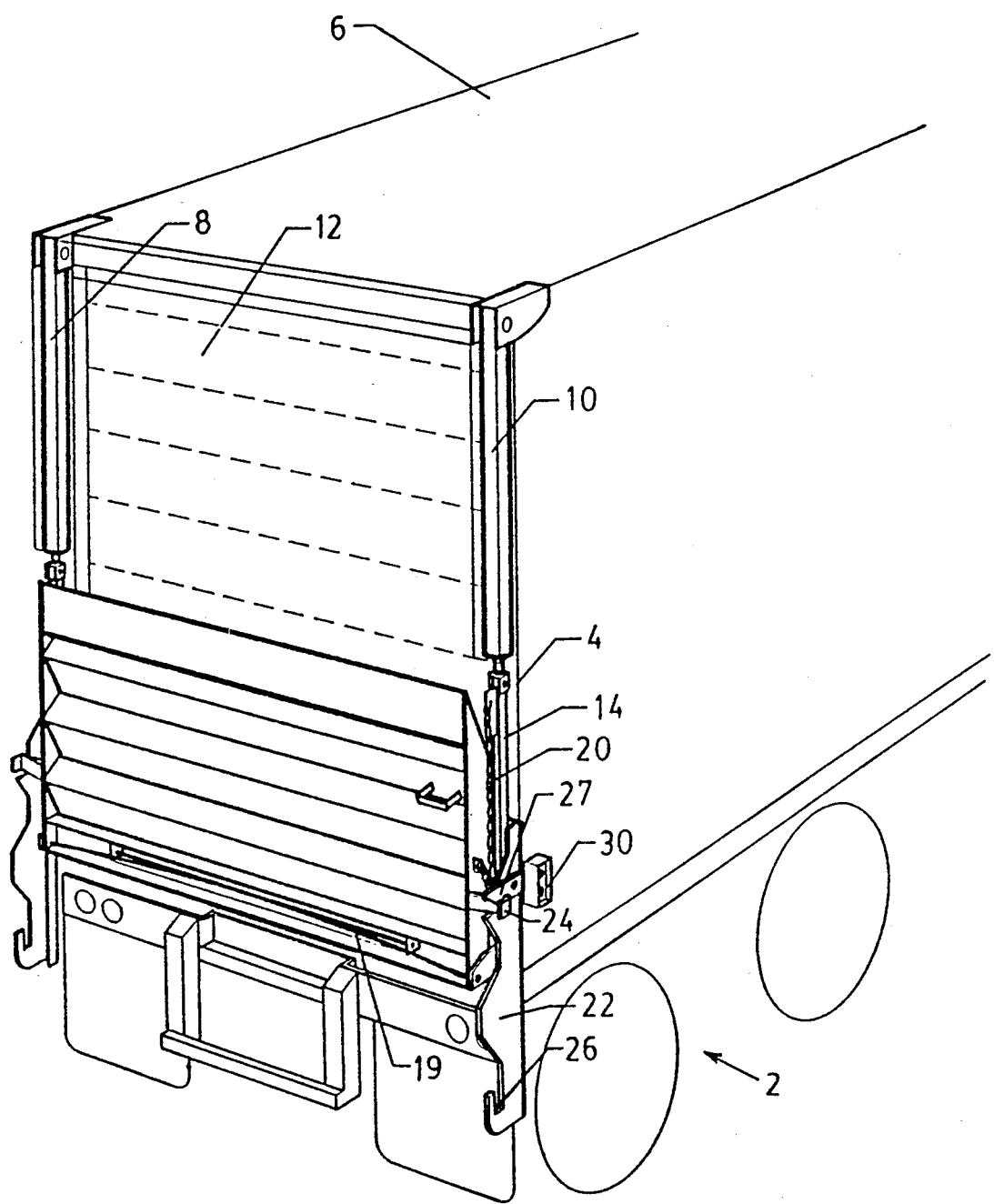
FIG. 2 is a partial perspective view of a platform lift located at the rear of a trailer where the platform is in an upper vertical position.

Referring to the drawings in greater detail, in FIGS. 1 and 2, there is shown a platform lift 2 mounted at a rear 4 of a trailer 6 (only part of which is shown). The lift 2 has a first cylinder 8 and a second cylinder 10, each of the cylinders being mounted vertically, one on each side of a door 12 of the trailer 6. Each cylinder 8, 10 has a rod 14 that is connected to a piston (not shown in FIG. 1). A free end of each rod 14 opposite to the piston is pivotally connected to an inside corner 16 of a platform 18. The platform is spring-mounted (not shown) in a conventional manner so that it can be easily moved from a horizontal position to a vertical position by pivoting the platform upward from the position shown in FIG. 1. For example, as is conventional, the platform is counterbalanced with a torsion bar 19. Flexible cables or chains 20 prevent the platform 18 from pivoting beyond the horizontal position. Supports 22 are vertically mounted on either side of the door 12 at the rear of the trailer to hold the platform in a vertical position through interlocking means 24 on the platform 18 and interlocking means 26, 27 on the supports 22. The interlocking means 24 is a projection extending outward from either end 28 of the platform 18. The interlocking means 26 are two lower channels, one in each of the supports 22. Channels 26 are designed for holding the platform in a vertical position when the platform has been lowered. The interlocking means 21 are two upper channels 27, one in each of the supports 22. The upper channels 27 are designed to hold the platform in an upper vertical position as shown in FIG. 2. Each of the upper channels 27 has disengagement means 28 for disengaging the projections 24 from the channel 27. Once disengaged, the platform 18 can be pivoted from the vertical position shown in FIG. 2 to a horizontal position with the chains 20 fully extended.

It will also be noticed that there are control means 30 for activating the hydraulic cylinders 8, 10 to raise and lower the platform 18. The position of the platform shown in FIG. 2 is the travel position, (i.e. for use when the truck is travelling down a highway). The position of the platform shown in FIG. 1 is the loading or unloading position. There are two other distinct positions, one occurring when the platform is in an upper horizontal position and the other occurring when the platform is in a lower vertical position. The upper horizontal position and all intermediate horizontal positions are positions for unloading or loading cargo. The lower vertical position is used when a loading dock is available and it is desired to get the platform out of the way so that the trailer can be loaded or unloaded directly from the loading platform without using the platform lift 2.

Figure 3:
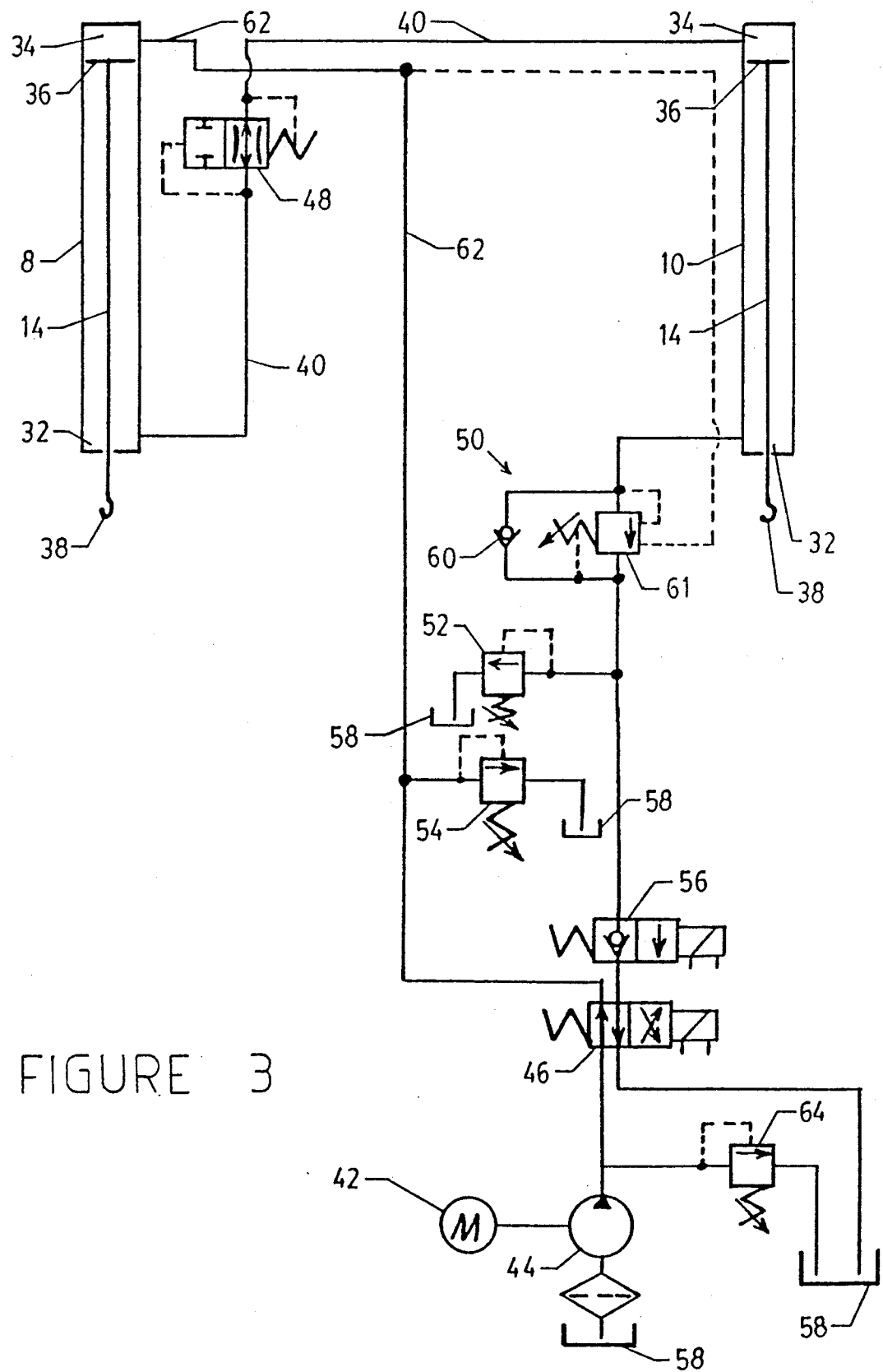
FIG. 3 is a schematic view of an hydraulic circuit for the lift of the present invention.

In FIG. 3, a schematic of a hydraulic circuit for the lift platform 2 is shown. Each of the cylinders 8, 10 has a rod end 32 and a cap end 34 together with a piston 36. The cylinders 8, 10 are oriented so that their rod ends 32 extend downward. The rods 14 are much longer in actual use than their lengths as shown in FIG. 3. Each rod 14 has a free end 38. The first cylinder 8 has a larger cross-sectional size than the second cylinder 10. The area of the first cylinder 8 at the rod end 32 minus the area of the rod 14 is equal to or at least substantially equal to an area of the second cylinder 10 at the cap end 34. The closer these relative cross-sectional areas are to being equal, the better the lift system will operate.

The cylinders 8, 10 are interconnected by a connecting line 40 so that hydraulic fluid can flow between the rod end 32 of the first cylinder 8 and the piston 34 of the second cylinder 10 as the cylinders are activated. Control means 42 and pumping means 44 are connected to activate the cylinders 8, 10. The connection of the free ends 38 of the rods 14 to the platform 2 is not shown in FIG. 3. The control means 42 can activate the cylinders 8, 10 either upward or downward.

An electric solenoid activated four-way directional control valve or double acting power pack 46 controls the flow of fluid through two lines in two different directions. A velocity fuse 48 is located in the connecting line 40 to control the flow rate of the hydraulic fluid through the connecting line. Also, if the connecting line is severed or develops a leak, the flow of hydraulic fluid through the velocity fuse will be automatically shut off. It should be noted that the velocity fuse is not a necessary component of the platform lift and could be eliminated from the hydraulic circuit entirely. A restriction means or counterbalance valve 50 is connected in the line extending between the rod end of the small cylinder 10 and the control means 32 and pumping means 44. The purpose of the counterbalance valve is to prevent any cavitation from occurring in the hydraulic system and also to prevent the platform from coming down too fast (i.e. faster than the flow of the pump) during normal operation or from crashing down if a line breaks. A first pressure relief valve 52, connected to the same line as the counterbalance valve 50, is set at a pressure above the system pressure so that it will protect against overload of the platform. A second pressure relief valve 54 is connected to the line between the four-way directional control 46 and the cap end 34 of the first cylinder 8. The relief valve 54 is set below system pressure in order to limit downforce of the platform and cylinder to a predetermined maximum.

An electric solenoid activated first check valve 56 is located between the pressure relief valve 52 and the four-way directional control 46. The first check valve 56 can be activated between two positions, one position permitting flow upward to the second cylinder but preventing flow downward from the second cylinder to the control 46 and the other position permitting flow downward but preventing flow upward. Numerous reservoirs 58 for hydraulic fluid are shown for ease of illustration.

In operation, the platform moves upward or downward as the pistons move upward or downward respectively. If it is desired to move the pistons upward, the electric solenoid four-way directional control 46 is activated to permit an upward flow to the second cylinder 10 and a downward flow from the first cylinder 8. Similarly, the first check valve 56 is activated to permit upward flow to the second cylinder 10 through the counterbalance valve 50 as shown in FIG. 2 but to prevent any downward flow. The counterbalance valve 50 has two components, a second check valve 60 and a two-way valve 61. In an upward mode for the cylinder the hydraulic fluid flows through the check valve 60 to rod end 32 of the second cylinder 10. This in turn causes the piston 36 and rod 14 to move upward toward the cap end 34. The upward movement of the piston 36 in the second cylinder 10 causes the hydraulic fluid above the piston 36 to be forced through the connecting line 40 and the velocity fuse 48 and into the rod end 32 of the first cylinder 8. The more accurate the relative sizing of the two cylinders, the more precisely one cylinder will track with the other. The hydraulic fl id entering the rod end 32 of the first cylinder 8 causes the piston 36 to move upward, thereby displacing the hydraulic fluid above the piston and forcing it out of the cylinder 8 and through a line 62. The fluid flows through the line 62 back through the four-way control 46 to the reservoir 58. In this manner, the pistons are moved upward until the platform attains the desired level.

A third pressure relief valve 64 is connected to the line between the pump and tank or reservoir 58. The valve 64 determines the maximum pump pressure which corresponds to the maximum system pressure when the pump is operating.

Alternatively, in order to move the pistons and the platform downward, the four-way directional control 46 is moved to a second position which prevents hydraulic fluid from flowing upward into the rod end of the second cylinder 10 but allows hydraulic fluid to flow upward through the line 62 into the cap end 34 of the first cylinder 8. As hydraulic fluid enters the cap end 34 of the first hydraulic cylinder 8, the piston 36 is forced downward and the fluid beneath the piston is forced through the connecting line 40 and the velocity fuse 48 into the cap end 34 of the second cylinder 10. This in turn forces the piston 36 of the second cylinder 10 downward, thereby forcing hydraulic fluid located beneath the piston 36 out of the second cylinder 10 at the rod end 32. The fluid flows through the two-way valve 61 of the counterbalance valve 50 and back to the first check valve 56 which has been activated to a second position to permit downward flow to the four-way directional control valve 46 and back to the reservoir 58. In this way, the pistons are forced downward.

As can be readily seen, the movement of the pistons within the cylinders is caused by forcing hydraulic fluid from the pumping means 44 directly into one of the cylinders only. The hydraulic fluid flowing through the connecting line activates the other cylinder. For upward movement of the pistons, the fluid is forced directly into the rod end of the second cylinder. For downward movement of the pistons, the fluid is forced directly into the cap end of the first cylinder. Thus, there is a positive force exerted by the cylinders in both an upward and downward direction.

The control means also includes the counterbalance valve 50 which prevents the platform from coming down too quickly. The dotted lines shown in FIG. 3 extending from the two-way valve 61 are pilot lines that carry pressure signals to sensors within the various valves but little, if any, hydraulic fluid flows through these pilot lines. It can be seen that the two-way valve 61 has three different pilot lines connected thereto, one being connected into the line 62 of the first cylinder 8, the other being connected to the line between the two-way valve 61 and the rod end of the second cylinder 10 and the third pilot line being connected between the up pressure line and the two-way valve 61 to ensure that fluid coming upward passes through the check valve rather than through the two-way valve 61. The two-way valve 61 has two distinct positions: an open position permitting downward flow only; and a closed position permitting no flow in either direction. Preferably, the two-way valve is a modulating valve that modulates between the open and closed position as the platform is lowered. In other words, the valve 61 will often be in a partially open position rather than fully open or fully closed as the platform is lowered, thus allowing the platform to be lowered smoothly. If the two-way valve is of the type that cannot be made to modulate between open and closed positions and if conditions are such that the platform would otherwise lower faster than the pump is able to pump fluid into the first cylinder, the platform will stop periodically or chatter as the counterbalance valve 61 opens and closes. Of course, the rate at which the platform is lowered will depend on the weight of the cargo being lowered on the platform and the capacity of the hydraulic pump. It is only when the load on the platform is sufficient to cause hydraulic fluid to flow out of the last end of the cylinder at a faster rate than the pump can pump fluid through the hydraulic system that the counterbalance valve 61 will be utilized. The two-way valve 61 is preferably set so that it permits lowering of the platform until pressure is not less than one-tenth on the down side of the pressure on the upside. In FIG. 3, the rod end 32 of the second cylinder 10 is the last end as it is located furthest along the flow path from the pump 44 when the platform is being lowered. The counterbalance valve 50 controls the flow from this last end 32. The components of the hydraulic circuit are well known to those skilled in the art.

Figure 4:
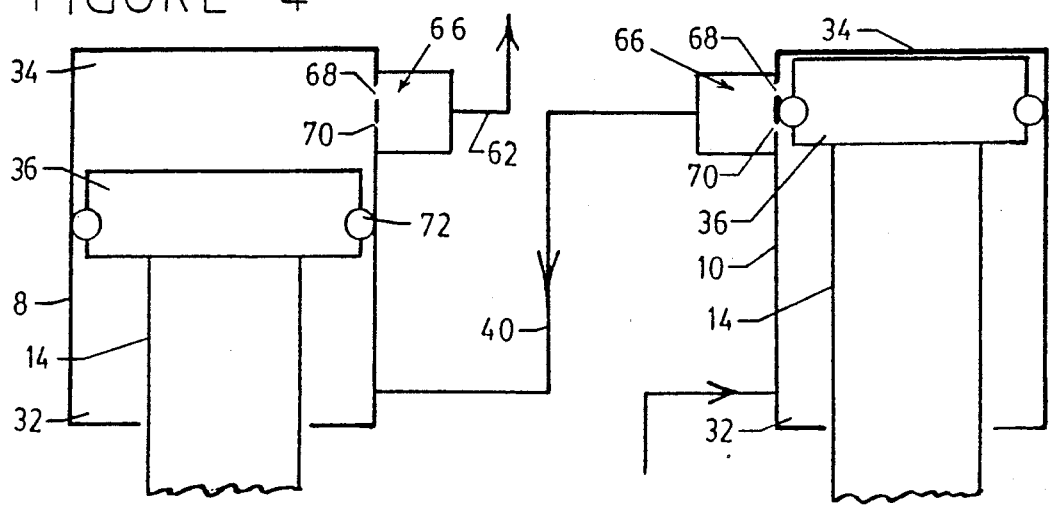
FIG. 4 is a partial schematic view of a self-levelling system when a second cylinder reaches an uppermost position before a first cylinder.
Figure 5:
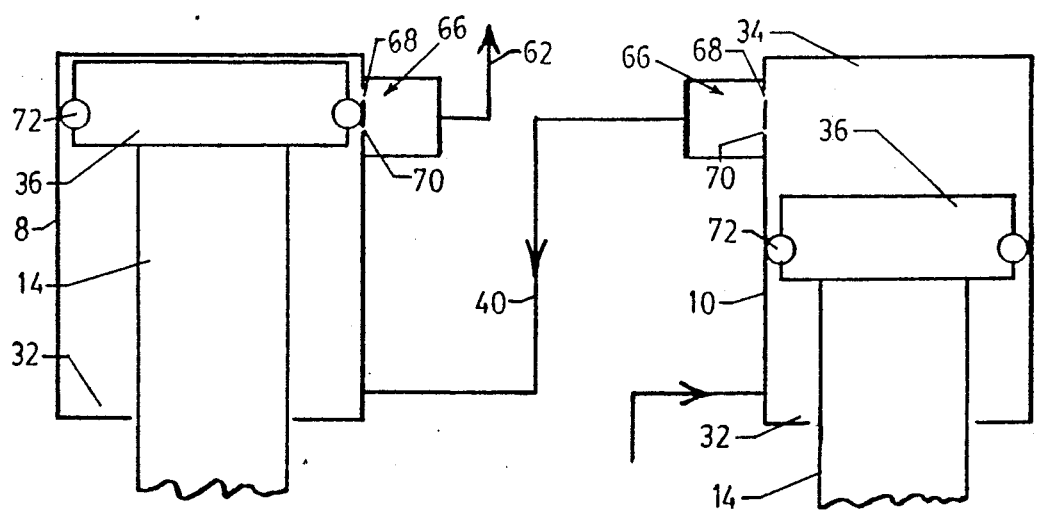
FIG. 5 is a partial schematic view of a self-levelling system when the first cylinder reaches the uppermost position before the second cylinder.
Figure 6:
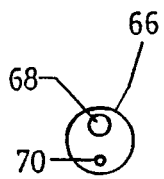
FIG. 6 is a front view of a double port.

In FIGS. 4, 5 and 6, there is shown a self-levelling feature for the platform. The cap end 34 of each cylinder 8, 10 contains a double port 66 for the ingress and egress of hydraulic fluid. Each double port has an upper orifice 68 and a lower orifice 70 which are spaced vertically apart from one another. The lower orifice 70 is tiny in size when compared to the upper orifice 68. As can be seen from the Figures, the orifices, 68, 70 are located so that when the piston 36 is in the uppermost position within one of the cylinders, the lower orifice 70 is not sealed off from the hydraulic fluid in the rod end 32 of that cylinder by a seal 72 on each piston 36. Further, it can be seen that the double port 66 of the second cylinder 10 is connected into the connecting line 40 between the two cylinders. The double port 66 of the first cylinder 8 is connected to the line 62 of said first cylinder. For ease of illustration the cylinders 8, 10 are shown in FIGS. 4 and 5 to be much shorter than they actually are.

In operation of the self-levelling system, if the circumstances shown in FIG. 4 are considered first, when the piston 36 of the second cylinder 10 reaches the uppermost position before the piston 36 of the first cylinder 8, the piston in the first cylinder 8 can be forced continually upward until it too attains the uppermost position within the cylinder. The continued upward force on the piston of the first cylinder 8 can occur because the control means can continue to be activated in an upward mode and hydraulic fluid can continue to pass from the cap end 34 of the cylinder 10 through the lower orifice 70 and hence through the connecting line 40 to the rod end 32 of the first cylinder 8. This will cause the piston in the first cylinder to continue to move upward and hydraulic fluid will continue to be forced through the double port 66 of the first cylinder 8 to the line 62 until the piston reaches the uppermost position within the first cylinder 8.

Thus, when it is desired to lower the platform, the two pistons will start from the same level. It is important that the lower orifice 70 be very tiny relative to the upper orifice 68. For example, fifteen one-thousandths of an inch has been found to be satisfactory in one embodiment for the diameter of the lower orifice 70. The lower orifice 70 shown in the drawings is much larger than its actual size when compared to the size of the upper orifice 68. If the lower orifice is too large, the cylinders will not start in a downward motion.

The self-levelling system also works when the piston in the first cylinder 8 attains the uppermost level before the piston in the second cylinder 10. This situation is shown in FIG. 5. When the piston in the first cylinder 8 attains the uppermost position, the piston in the second cylinder 10 can continue to move upward because hydraulic fluid is being forced into the rod end of the second cylinder 10. This will cause the piston in the second cylinder 10 to continue to move upward. Hydraulic fluid above the piston of the second cylinder 10 will continue to move through the double port 66 of that cylinder through the connecting line 40 to the rod end of the first cylinder 8. Hydraulic fluid can continue to flow out of the cap end of the first cylinder 8 through the lower orifice 70 and to the line 62. Thus, the pistons can be levelled at their uppermost position whenever they become unlevel simply by continuing to activate the cylinders through the control means 42 in an upward mode. During normal operation of the lift 2 the pistons will almost always be level with one another. In the event that the pistons are not level at any time, the problem can be corrected simply by moving the pistons and the platform to their uppermost position. The correction is automatic and can be done each time the pistons are moved through the uppermost position, thereby correcting the problem before it becomes serious.

The two cylinders, which can be referred to as phasing cylinders, have a size relationship that is based on the formula for the area of a circle:

$$A = \pi r2$$

The cross-sectional area of the fluid in the rod end of the first cylinder is as follows:

$$A_1 = (D_12 - d_r2) \div 1.27$$

where
D$_1$ is the inside diameter of the first cylinder; and
where
d$_r$ is the outside diameter of the rod of the first cylinder.

Similarly, the cross-sectional area of the fluid in the second cylinder is:

$$A_2 = D_2^2 \div 1.27$$

where
D$_2$ is equal to the inside diameter of the second cylinder.

As long as these cylinders are designed so that A$_1$ is equal to A$_2$ or that A$_1$ is at least substantially equal to A$_2$, the system will work. For example, where the inside diameter of the first cylinder is 2.015 inches and the outside diameter of the rod in that cylinder is 1.0 inch, the inside diameter of the second cylinder is 1.749 inches. The lift takes up a minimum of space at the rear of a truck or trailer as the inside diameter of the first cylinder would not exceed three inches for most applications.

It can readily be determined that some of the features of the hydraulic circuit can be deleted while still achieving the main advantages of the present invention. For example, some of the pressure relief valves could be omitted or a different control means could be substituted. Also, it is not necessary to design the system with the self-levelling feature even though it would be advisable to do so. Further, it is not absolutely essential to have both the four-way control 46 and the first check valve 56. Though it is not recommended, the lift will work in the short term as long as there is a valve to direct the hydraulic fluid in either of two directions through the hydraulic circuit. However, the counterbalance valve or some other restriction means is considered necessary for satisfactory use of the invention. It should be noted that for ease of illustration all filters have been omitted from the hydraulic circuit shown in FIG. 3. Filters are conventional in any hydraulic system and their use will be readily apparent to those skilled in the art. If the filters had been included, the circuit diagram would have been unnecessarily complex.

The hydraulic system for the platform lift 2 is also designed for thermal relief. If the trailer is left in the hot sun and the hydraulic fluid expands from the heat, it can be expunged from the system through the third pressure relief valve 64 or one of the other relief valves. The system is located entirely on either side of the door at the rear of a trailer. Therefore, for trailers of different widths, it is a relatively simple matter to construct a wider or narrower platform and to space the cylinders either further or closer to one another depending on the width of the trailer. In the travel position, the cylinders are in a closed position and thereby protected from the elements such as road salt as much as possible. While the platform shown in the drawings is of fixed construction, it is possible to use the system with a bifold platform.

The system can be used easily on the first trailer of an A-train, B-train or C-train as the platform lift of the present invention, except for the platform itself, is located entirely along each side of the trailer and not underneath the trailer or in the central area of the rear of the trailer. Of course, the platform lift can easily be used with any door of any truck trailer or truck of appropriate size. Since the cylinders are direct acting, the trailer or truck must be of sufficient height to allow the cylinders to be long enough to move the platform between the ground and the floor of the trailer.

Numerous changes within the scope of the attached claims will be readily apparent to those skilled in the art. For example, the system shown in FIG. 3 can be designed so that the cylinders are upside down with the rod ends coming out of the top of each cylinder rather than the bottom. While additional connecting means will be required to connect the rod ends to the platform in this embodiment, there are advantages that justify the additional connecting means. For example, in the travel position, when the platform is loaded and the truck is travelling down a highway, the cylinders will be extended and no part of the platform lift system will be located below the door of the truck or trailer. In this upside down embodiment, if we refer to the cylinder having the larger diameter as the major cylinder and the cylinder having the smaller diameter as the minor cylinder, the counterbalance valve will be located to control the flow of fluid out of the cap end of the major cylinder during lowering of the platform. The pump will pump hydraulic fluid into the rod end of the minor cylinder. The cap end of the minor cylinder will be connected to the rod end of the major cylinder so that as the piston in the minor cylinder moves downward, hydraulic fluid will force the piston in the major cylinder downward as well, thereby forcing hydraulic fluid from an outlet of the cap end or last end of the major cylinder through the counterbalance valve.

What I claim as my invention is:

1. A platform lift for use with a cargo door of a truck or truck trailer, said door having a lower edge and two sides, said truck or trailer resting on a supporting surface, said lift comprising:
   (a) a platform having an upper surface and two ends;
   (b) two vertically mounted hydraulic cylinders, a first cylinder being mounted at one side of said door and a second cylinder being mounted at the other side of said door, each cylinder containing a rod and a piston, and each cylinder having a rod end and a cap end with the platform being connected to the rod of each cylinder;
   (c) the first cylinder having a larger cross-sectional size than the second cylinder such that a cross-sectional area of the first cylinder at the rod end minus a cross-sectional area of the rod of the first cylinder is substantially equal to a cross-sectional area of the second cylinder at the cap end;
   (d) the cylinders being interconnected by a connecting line so that hydraulic fluid can flow between the rod end of the first cylinder and the cap end of the second cylinder as the cylinders are activated, said cylinders and said connecting line being a cylinder portion, said cylinder portion having an entrance where hydraulic fluid enters the cylinder portion and an exit where hydraulic fluid exits the cylinder portion;
   (e) control means, reservoir means and pumping means for hydraulic fluid connected with said cylinder portion to form a closed hydraulic circuit, to activate the cylinders of said cylinder portion, said control means including a counterbalance valve so that, when hydraulic fluid is forced into the entrance of said cylinder portion:
      (i) said counterbalance valve is mounted to control, during lowering of the platform, flow of hydraulic fluid from said exit from said cylinder portion;
      (ii) said counterbalance valve sensing pressure, during the downward movement of the platform, of the hydraulic fluid being forced into the entrance of said cylinder portion from said pumping means to ensure that said pressure does not fall below a predetermined minimum by decreasing the flow of hydraulic fluid from said exit from said cylinder portion;
      (iii) said counterbalance valve permitting said platform to be lowered while preventing hydraulic fluid from flowing out of said exit from said cylinder portion at a rate that is faster than the pumping means can pump fluid into the entrance of said cylinder portion;
   (f) each rod of the cylinders having a free end opposite to an end that is connected to the piston, the free ends of the rods and the platform being connected so that the platform can be moved upward or downward hydraulically between a lower edge of said door and said supporting surface with a positive force by appropriately activating the cylinders so that the pistons move upward or downward;
   (g) the platform being pivotally connected so that its upper surface can be moved from a vertical position to a horizontal position and vice-versa, as desired, the platform being capable of being located in a vertical position entirely below the door of the truck or trailer by forcing the cylinders downward.

2. A platform lift as claimed in claim 1 wherein cylinders are oriented so that the rod ends extend downward and the exit from the cylinder portion is the rod end of the second cylinder.

3. A platform lift as claimed in claim 2 wherein the cylinders are oriented so that the rod ends extend downward,
   (a) when the pistons are forced downward, the control means is connected to force hydraulic fluid into the cap end of the first cylinder between the piston and the cap end, the hydraulic fluid flowing through the connecting line from the first cylinder to the second cylinder; and
   (b) when the pistons are forced upward, the control means is connected to force hydraulic fluid into the rod end of the second cylinder between the piston and said rod end, the hydraulic fluid flowing through the connecting line from the second cylinder to the first cylinder.

4. A platform lift as claimed in any one of claims 1, 2 or 3 wherein the pistons are self-levelling, the cap end of each cylinder containing a double port for the ingress and egress of hydraulic fluid, the double port having an upper orifice and lower orifice spaced vertically apart from one another, the lower orifice being tiny in size when compared to the upper orifice, the orifices being located so that when the piston is in the uppermost position within the cylinder, the lower orifice is not sealed off from the hydraulic fluid in the rod end of the cylinder and the upper orifice is sealed off, the double port of the second cylinder being connected into the connecting line between the first and second cylinders, the double port of the first cylinder being connected to a line for the hydraulic fluid extending to the control means.

5. A platform lift as claimed in any one of claims 1, 2 or 3 wherein the lift has four distinct positions, two upper positions and two lower positions, one upper position having the platform in a horizontal position and the other upper position having the platform in a vertical position, one lower position having the platform in a horizontal position and the other lower position having the platform in a vertical position.

6. A platform lift as claimed in claim 3 wherein the control means further includes a double acting power pack, said power pack having two positions, one position allowing hydraulic fluid to flow into the rod end of the second cylinder for upward movement of the cylinders and the other position allowing hydraulic fluid to flow into the cap end of the first cylinder for downward movement of the cylinders.

7. A platform lift as claimed in claim 6 wherein there is an electric solenoid activated first check valve located between the power pack and the second cylinder, said check valve having two positions, one position permitting flow of hydraulic fluid to the second cylinder and the other position permitting flow of hydraulic fluid downward to the power pack.

8. A platform lift as claimed in claim 6 wherein there is a first pressure relief valve connected between the second cylinder and the power pack which can release hydraulic fluid where the fluid expands due to thermal expansion or where the platform is overloaded.

9. A platform lift as claimed in claim 2 wherein the counterbalance valve has two components, a second check valve and a two-way valve, the second check valve allowing fluid into the rod end of the second cylinder, the two-way valve having an open position and a closed position and being connected so that fluid cannot flow out of the rod end of the second cylinder any faster than the pumping means can pump fluid through the hydraulic system.

10. A platform lift as claimed in claim 9 wherein the two-way valve modulates between an open and closed position to control the flow of fluid out of the rod end of the second cylinder.

11. A platform lift as claimed in any one of claims 1, 2 or 3 wherein the platform is pivotally connected to the rods of the cylinders at the inner corners thereof, with one inner corner being connected to each rod, there being a plate along each side of the door with each plate having upper and lower interlocking means therein, the platform having corresponding interlocking means on either end thereof so that the platform can be locked into a vertical position when the cylinders are in an upper position or a lower position.

12. A platform lift as claimed in any one of claims 1, 2 or 3 wherein the inside diameter of the first cylinder does not exceed three inches.

13. A platform lift as claimed in claim 8 wherein there is a second pressure relief valve connected between the power pack and the cap end of the first cylinder, said second pressure relief valve being set below system pressure to limit downforce of the platform and the cylinder to a predetermined maximum.

14. A platform lift as claimed in claim 13 wherein there is a third pressure relief valve connected between the pumping means and the reservoir to control the maximum pressure of the hydraulic circuit when the pumping means is operating.

* * * * *